May 5, 1936.　　　　E. GERHARD　　　　2,039,897
RADIO RECEIVER FOR ULTRA SHORT WAVES
Filed Dec. 16, 1931
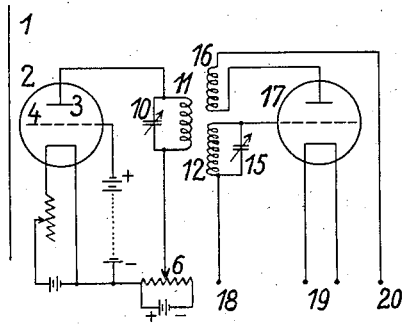
Fig. 1
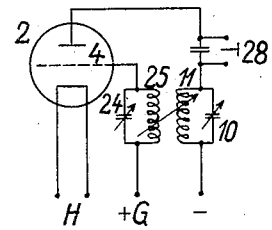
Fig. 2
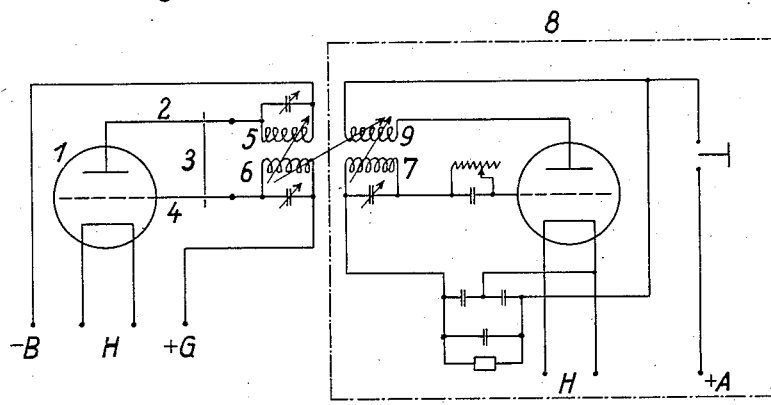
Fig. 3
Fig. 4
E. Gerhard
INVENTOR
By Marks & Clerk
ATTYS.

Patented May 5, 1936

2,039,897

UNITED STATES PATENT OFFICE 2,039,897

RADIO RECEIVER FOR ULTRA SHORT WAVES

Ernst Gerhard, Berlin-Charlottenburg, Germany, assignor to N. V. Machinerieen-en Apparaten Fabrieken "Meaf", Utrecht, Netherlands Application December 16, 1931, Serial No. 581,448
In Germany April 2, 1929

5 Claims. (Cl. 250—20)

The present invention relates to useful improvements in radio communication with ultra-short electric waves. Electron tubes are used in the braking field circuit for receiving such short electric waves wherein the grid electrode has a high positive voltage and the braking electrode (plate) surrounding the grid electrode has a comparatively small positive or negative voltage. Moreover, there is connected to the electrodes an ultra high frequency oscillatory circuit which is tuned to the wave to be received. Moreover, receiving antennæ may be connected to this receiving system consisting of an oscillatory circuit and the exciting electrodes. When electrical waves impinge on the reception system, the valve in the oscillating state, especially in the case of resonance, shows a variation of the plate and the grid current which depends on the intensity of the received radiation. If the transmitter wave is modulated at low frequency, the same modulation occurs in the plate and grid circuit of the receiving valve and can be amplified at audio-frequency in a known manner and made audible.

The present invention provides means whereby the reception using valves in the braking field circuit can be made substantially more sensitive and more efficient, the means described being used separately or in combination.

According to the invention in the electrode circuit of the ultra short wave valve, for example, between the plate and the cathode or between the grid and the cathode, or in both circuits, impedances, inductive, capacitative, ohmic or resonance resistances (oscillatory circuits) are interposed which are made variable, and, if necessary, are capable of being coupled together. The impedances are made such that they form a high inductive, capacitative or resonance resistance for high frequencies.

With one of the above described arrangements a more sensitive and efficient reception can be obtained than has hitherto been possible, and it can be effected in various manners as more closely described below.

It is known that in ultra short wave receivers an increase in sensitivity can be obtained by applying an auxiliary alternating voltage, preferably of high frequency, to the electrodes of the ultra short wave valve in the braking field circuit.

If, as described, a high impedance is interposed in the electrode circuits and a direct current voltage is imparted to the electrodes so that the valve is in front of the oscillatory member, the sensitiveness of reception can be increased by an auxiliary alternating voltage of small amplitude which is preferably of high frequency. By the high frequency variation of the working voltages of the adjusted valve, this valve operates during a half period of the auxiliary oscillation as a weak oscillatory sender and during the other half phase as a strongly damped receiver. The current, which occurs, at the braking electrode and is very great during this operation of the valve, shows a modulation corresponding to the modulation of the weak receiving wave at the electrodes of the ultra-short wave tube. This rectified alternating current may be strengthened and rendered perceptible in the known manner. A great sensitiveness of reception can be obtained by correctly measuring or adjusting the impedances interposed in the electrode circuits and the amplitude of the auxiliary alternating voltage.

Since it is possible to produce a drooping characteristic of braking electrode current and braking electrode voltage by a suitable selection of the direct current voltages at the braking electrode so that oscillatory circuits can be excited to undampen oscillations by the current at the braking electrode, the auxiliary alternating voltage can be produced by the ultra-short wave valve, in which case an oscillatory circuit as impedance must then be inserted in the braking electrode circuit.

There is thus a kind of super-regenerative reception so that there is a great increase in sensitivity.

Fig. 1 shows a constructional form of the invention with a high frequency auxiliary generator.

Figure 2 shows an example wherein the auxiliary alternating voltage is effected by means of an ultra short wave receiving valve.

Figure 3 shows an ultra short wave valve in combination with a strongly radiating reactively coupled receiver.

Figure 4 shows an ultra short wave valve with a reactively coupled high frequency receiver.

The receiving bipole 1, see Fig. 1, is inductively coupled with the ultra short wave valve 2. The latter is arranged in the braking field circuit. The grid 4 of this valve has a high positive voltage of some hundreds of volts, the plate 3 has a comparatively small positive or negative voltage obtained from the potentiometer 6. In the circuit of the plate is the high frequency oscillatory circuit 10 and 11 which can be tuned. The oscillator valve 17 is arranged in an ordinary reactive circuit and generates the desired auxiliary alternating voltage which is transmitted through the coils 12 and 16 to the oscillatory circuit 10 and 11, by which means, as above described, the increase of sensitivity of the ultra short wave valve 2 is effected.

The generation of the auxiliary alterating voltage can also be effected by means of the ultra short wave receiving valve itself. The thermionic valves in the braking field circuit have within a certain voltage range a drooping current-voltage characteristic. The operating data of the receiving valve (for example the grid voltage or the plate voltage) thus only need to be adjusted so that the oscillatory circuit interposed in the corresponding circuit is excited to oscillations at its natural frequency. These oscillations then generate the desired auxiliary alternating voltage, the frequency of which is substantially different from the frequency of the ultra short waves being received simultaneously by the valve.

Fig. 2 shows a constructional example of a suitable circuit for this purpose. The ultra short wave valve 2 is again arranged in the braking field circuit. The grid 4 has a high positive voltage $+G$, the plate has a small negative voltage. In the grid circuit is the high frequency oscillatory circuit 24 and 25, in the plate circuit the high frequency oscillatory circuit 10 and 11, these circuits being coupled together. The voltages at the valve 2 are so adjusted that the circuits 10, 11 and 24, 25 are excited at their natural frequencies so that the required auxiliary alternating voltage is obtained at the electrodes of the valve. The low frequency modulation of the ultra short waves received at the same time by the valve 2 can be heard in the telephone 28.

If the ultra short transmitted wave is modulated at high frequency, preferably, at least, one of the oscillatory circuits arranged between the electrodes of the receiving valve is tuned to the modulation frequency or a frequency near to it. In this way a beat frequency can be generated, as is known in connection with a reactively coupled valve.

It is often of advantage to interrupt periodically with a still lower frequency the auxiliary alternating voltage applied to the electrodes of the ultra short wave valve so that there is a super-regenerative effect with reference to the auxiliary frequency also.

In a further constructional form of the invention for generating the high frequency auxiliary alternating voltage, use is made of a strongly radiating high frequency receiver, for example, a reactive receiver or better an oscillating reactive receiver (super-regenerative receiver) which is coupled with the ultra short wave receiving valve in the braking field circuit. With this receiver the high frequency modulation of the received wave can be received at the same time.

Fig. 3 shows an arrangement in which the ultra short wave receiving valve is combined with a strongly radiating super-regenerative receiver. The valve 1 in the braking field connection is to receive the ultra high transmitted frequency $f0$, which is modulated with the high frequency $f1$. The oscillatory circuit 2, 3, 4 provided inside the valve 1, or outside it, is tuned to the frequency $f0$. Between the plate and the cathode and between the grid and the cathode of the valve 1 are arranged the high frequency oscillatory circuits 5 and 6, which are tuned to the modulation high frequency $f1$. These circuits are coupled through the coil 7 to the super-regenerative receiver 8, with the ordinary circuit, which receives the modulation frequency $f1$ produced in the circuits 5 and 6. At the same time there are generated in the reaction coils 7 and 9 of the receiver 8 sufficiently strong high frequency auxiliary modulations which, by coupling with oscillatory circuits 5 and 6, are transmitted to the receiving valve 1 and cause an increase of sensitivity of this valve for receiving ultra short waves.

According to Fig. 4, the ultra short wave valve 1 is combined with a reactively coupled high frequency receiver 29. The auxiliary alternating voltage generated by the high frequency receiver 29 is transmitted through the reaction coils 8 to the oscillatory circuits 5 and 6 and thereby to the receiving valve 1. By means of the high frequency receiver, the modulation high frequency of the ultra short received wave can again be received simultaneously if the oscillatory circuits 5 and 6 and the high frequency receiver 29 are tuned to this frequency.

Experiments have shown that when the ultra short received wave is modulated at low frequency, the auxiliary oscillations applied to the ultra short wave valve are modulated with the same low frequency when the operating voltages are suitably chosen. It is immaterial whether the auxiliary oscillations are generated by the ultra short wave valve within or whether they are supplied from outside. This fact is employed according to the invention for ultra short wave receivers. In the arrangement according to Fig. 4, for example, reception can be obtained even when the ultra short received wave is modulated not at high frequency but only at low frequency. The high frequency auxiliary oscillations transmitted to the oscillatory circuits 5, 6 from the reaction coils 8 are, according to experience, modulated with the low frequency modulation oscillations of the received ultra short waves, and the so modulated high frequency is then further amplified and made audible by the receiver 29. The same result is obtained if the operating conditions of the ultra short wave 1 are so adjusted that the oscillatory circuits 5 and 6 are excited in their natural frequency (high frequency). In this case also these high frequency oscillations are modulated with the modulation frequency of the received ultra short waves so that the modulated high frequency can be further amplified by the receiver 29.

Experiments have also shown the following: When the valve in the braking field circuit receives modulated ultra short waves, and if the operating conditions of the valve are so adjusted that it is periodically excited to ultra high frequency oscillations by an auxiliary alternating voltage produced by itself or otherwise, these ultra short waves generated by the receiving valve are modulated with the same frequency as the received wave itself. Since the intensity of the waves generated by the receiving valve is generally greater than that of the received wave, this process implies an amplification at high frequency of the ultra short waves.

According to the invention the short waves generated by the receiving valve and modulated with the modulation oscillations of the received wave are again received or further amplified by a thermionic valve in a known manner, or in the manner described above. The ultra high frequency oscillations amplified by the first or the following receiving valves can again act reactively on the first valve, or a further increase of sensitivity is obtained.

In all the braking field circuits, and especially in those of the above described arrangements, it is necessary that the operating voltages applied to the electrodes of the valves in the braking field circuit should be adjusted as accurately as possible. In the valves hitherto employed for the braking field circuits, there has, however, been a voltage drop of at least 3.5 volts along the incandescent cathode, so that the effective voltage between the different parts of the cathode and the other electrodes is different and an adjustment to the theoretically most favourable voltages is impossible.

According to the present invention the voltage drop along the cathode and the valve is made as small as possible and less than 3.5 volts. It is preferable to employ indirectly heated cathodes across the surface of which there is no difference of voltage.

In thermionic valves in the braking field connection, it is known that nearly the whole emission comes to the grid which is nearest to the incandescent filament which causes a considerable reheating of the cathode. According to the invention, for heating the cathode of the valve in the braking field circuit the heat loss due to the impact of the electrons on the positive grid is employed.

The detrimental effect of a voltage drop along the cathode of the valve can be further diminished by choosing as cathode point (point of reference) a point, the potential of which relative to the plate is equal to the mean potential of the cathode. According to the invention in the braking field circuits the electrical centre of a voltage divider lying between the ends of the valve cathode is used as the cathode point. In this arrangement the maximum difference of the potential at any point on the incandescent cathode from the potential of the cathode point is only half the voltage drop along the cathode.

It has been found advantageous to adjust the voltage of the plate in the state of rest, that is, before it is influenced by an auxiliary alternating voltage and by the received wave so that the electrons emitted from the incandescent cathode of the valve, and passing through the grid, turn back as near as possible to the plate so that a very small additional energy (reception energy) is required to cause the electrons to be caught by the plate.

According to the invention with this object in view, the steady voltage of the plate is made equal to the mean temperature voltage of the electrons emitted from the incandescent cathode of the valve, that is, equal to the negative voltage against which the electrons emitted from the cathode can proceed.

What I claim is:

1. A receiver for ultra short waves comprising an antenna for ultra high frequency waves modulated by auxiliary high frequency signal waves, a tube in damping field connection for modulating said received waves having a cathode, a grid and a plate, a circuit connecting the grid and the plate, tunable means in said circuit adapted to generate high frequency oscillations substantially at said modulated high frequency, means adapted to produce high frequency auxiliary oscillations at substantially the same frequency as said modulated high frequency, said first means and said second means being inductively coupled, whereby the auxiliary high frequency oscillations are imposed upon said circuit to increase the sensitivity thereof.

2. A receiver for ultra short waves comprising an antenna for receiving ultra high frequency waves modulated by auxiliary high frequency signal waves, a tube in damping field connection for modulating said received waves and having a plate, a grid and a cathode, a circuit connecting the grid and the plate, a tunable high frequency oscillatory circuit in said circuit adapted to generate high frequency oscillations at said modulated high frequency, a second tube in reactive circuit having a plate, a grid and a cathode, feed conductors connected to the grid and the plate and means connected in the circuit of the plate and the grid for producing high frequency auxiliary oscillations at substantially the same frequency as said modulated high frequency, said first tube and said second tube being inductively coupled, whereby the auxiliary high frequency oscillations are imposed upon said circuit of the first tube to increase sensitivity thereof.

3. A receiver for ultra short waves comprising a tube in damping field connection for modulating received waves and having a plate, a grid, and a cathode, feed conductors connected to said plate and said grid, portions of said feed conductors adjacent said tube forming a tunable Lecher system adapted to receive ultra high frequency waves modulated by auxiliary high frequency waves, oscillatory circuits in said feed conductors adjacent said Lecher system, said oscillatory circuits being inductively coupled and adapted to generate high frequency oscillations substantially at said modulated high frequency, and means for generating high frequency auxiliary oscillations at substantially the same frequency as said modulated high frequency, said means being inductively coupled to said oscillatory circuits, whereby the auxiliary high frequency oscillations are reactively imposed upon said grid and anode to increase sensitivity thereof.

4. A receiver for ultra short waves comprising a tube in damping field connection for modulating received waves and having a plate, a grid and cathode, feed conductors connected to said plate and said grid, portions of said conductors adjacent said tube forming a tunable Lecher system adapted to receive ultra high frequency waves, tunable oscillatory circuits in said feed conductors inductively coupled and adapted to generate high frequency oscillations substantially at said modulated high frequency, a strongly radiating receiver comprising a tube having a cathode, a grid and a plate, feed conductors connected to the grid and the plate, tunable means in the grid conductor for detecting the modulated oscillations generated by said oscillatory circuits and a reaction coil in the plate conductor inductively coupled to said tunable detecting means and adapted to generate auxiliary oscillations substantially at said modulated high frequency, said reaction coil and detecting means being inductively coupled to said oscillatory circuits whereby the auxiliary high frequency oscillations are impressed upon the circuits of said first tube to increase the sensitivity thereof.

5. A receiver for ultra short waves comprising a tube in damping field connection for modulating received waves and having, a plate, a grid and cathode, feed conductors connected to said plate and said grid, portions of said conductors adjacent said tube forming a tunable Lecher system adapted to receive ultra high frequency waves, tunable oscillatory circuits in said feed conductors inductively coupled and adapted to generate high frequency oscillations substantially at said modulated high frequency, a strongly radiating receiver comprising a tube having a cathode, a grid and a plate, feed conductors connected to the grid and the plate, a tunable oscillatory circuit and a detector circuit in the grid conductor tuned to substantially the modulated high frequency generated by said first oscillatory circuits and a reaction coil in the plate conductor inductively coupled to the latter tunable oscillatory circuit and adapted to generate auxiliary oscillations substantially at said modulated high frequency, said reaction coil and said latter oscillatory circuit being inductively coupled to said first oscillatory circuits, whereby the auxiliary high frequency oscillations are impressed upon the circuits of said first tube to increase the sensitivity thereof.

ERNST GERHARD.